United States Patent
Driesen et al.

(10) Patent No.: US 9,721,116 B2
(45) Date of Patent: Aug. 1, 2017

(54) TEST SANDBOX IN PRODUCTION SYSTEMS DURING PRODUCTIVE USE

(71) Applicants: Volker Driesen, Walldorf (DE); Peter Eberlein, Malsch (DE)

(72) Inventors: Volker Driesen, Walldorf (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 652 days.

(21) Appl. No.: 13/925,553

(22) Filed: Jun. 24, 2013

(65) Prior Publication Data

US 2014/0379677 A1  Dec. 25, 2014

(51) Int. Cl.
*G06F 17/30* (2006.01)
*G06F 21/62* (2013.01)

(52) U.S. Cl.
CPC .... *G06F 21/6227* (2013.01); *G06F 17/30424* (2013.01)

(58) Field of Classification Search
CPC ......... G06F 17/30339; G06F 17/30336; G06F 17/30595; G06F 17/30867; G06F 17/30174; G06F 17/30477; G06F 17/30312; G06F 17/30424
See application file for complete search history.

(56) References Cited

U.S. PATENT DOCUMENTS

| | | | |
|---|---|---|---|
| 5,319,645 A | 6/1994 | Bassi et al. | |
| 5,561,763 A | 10/1996 | Eto et al. | |
| 5,642,504 A | 6/1997 | Shiga | |
| 5,727,196 A * | 3/1998 | Strauss, Jr. | G06F 17/30492 707/696 |
| 6,199,069 B1 | 3/2001 | Dettinger et al. | |
| 6,578,026 B1 * | 6/2003 | Cranston | G06F 17/30327 707/696 |
| 6,970,865 B1 * | 11/2005 | Plasek | G06F 17/30327 707/999.003 |
| 7,406,457 B2 | 7/2008 | Kaiser | |
| 7,730,056 B2 | 6/2010 | Kaiser et al. | |
| 8,151,247 B2 | 4/2012 | Wefers | |

(Continued)

OTHER PUBLICATIONS

David Hull;SAP HANA inside track;Jul. 30, 2012;117;SAP AG,Walldorf,Germany.

(Continued)

*Primary Examiner* — Ashish K Thomas
*Assistant Examiner* — Rezwanul Mahmood
(74) *Attorney, Agent, or Firm* — Schwegman Lundberg & Woessner, P.A.

(57) ABSTRACT

Methods and systems are directed to controlling access to data in a production environment. Production data may be stored in a production database and test data may be stored in a test database. A production application may have access only to the data in the production database while a test application may have access to both the production database and the test database. The test application may have read-only access to the production database and read-write access to the test database. Data in the test database may be handled differently than data in the production database. A type of data may be associated with a range of valid values. The values assigned to the elements may differ depending on whether the elements are stored in the production database or the test database.

15 Claims, 8 Drawing Sheets

300

310

| PRODUCTION TABLE | |
|---|---|
| OBJECT ID | DATA VALUE |
| 1 | I |
| 2 | II |
| 3 | III |
| 4 | IV |
| 5 | V |
| | |

320

| TEST TABLE | |
|---|---|
| OBJECT ID | DATA VALUE |
| | |
| 996 | CMXCVI |
| 997 | CMXCVII |
| 998 | CMXCVIII |
| 999 | CMXCIX |
| 1000 | M |

(56) References Cited

U.S. PATENT DOCUMENTS

| | | | |
|---|---|---|---|
| 8,417,731 B2 | 4/2013 | Dehn et al. | |
| 2007/0078825 A1* | 4/2007 | Bornhoevd | G06F 11/3409 707/999.003 |
| 2007/0180509 A1 | 8/2007 | Swartz et al. | |
| 2007/0233884 A1* | 10/2007 | Farber | G06F 9/505 707/E17.119 |
| 2008/0052040 A1* | 2/2008 | Renner | G05B 19/406 702/182 |
| 2009/0259993 A1 | 10/2009 | Konduri et al. | |
| 2010/0138440 A1* | 6/2010 | Driesen | 707/765 |
| 2011/0022665 A1* | 1/2011 | Pinto | G06F 13/4247 709/206 |
| 2011/0289356 A1 | 11/2011 | Hossain et al. | |
| 2011/0314278 A1* | 12/2011 | Taskaya | H04L 9/28 713/167 |
| 2012/0102488 A1* | 4/2012 | Wintergerst | G06F 11/3495 718/1 |
| 2012/0136687 A1* | 5/2012 | Tang | G06Q 10/06311 705/7.15 |
| 2012/0180029 A1 | 7/2012 | Hill et al. | |
| 2012/0291014 A1* | 11/2012 | Shrinivasan | 717/124 |
| 2013/0007523 A1* | 1/2013 | Unger et al. | 714/32 |
| 2013/0173547 A1* | 7/2013 | Cline | G06F 17/303 707/638 |
| 2014/0006866 A1* | 1/2014 | Clifford | G06F 11/3684 714/32 |
| 2014/0280367 A1* | 9/2014 | Bloching | G06F 17/30339 707/803 |

OTHER PUBLICATIONS

Ruediger Karl;Run SAP business suite on SAP HANA;ASUG Annual Conference 2013;2013,accessed Jul. 16, 2014;30.

SAP AG; Infrastructure track: SAP HANA and Cloud Enabled Computing Center;Jul. 12-13, 2012;38;SAP AG,Walldorf,Germany.

* cited by examiner

TEST SANDBOX IN PRODUCTION SYSTEMS DURING PRODUCTIVE USE

TECHNICAL FIELD

The subject matter disclosed herein generally relates to the processing of data. Specifically, the present disclosure addresses systems and methods to control access to data in one or more databases.

BACKGROUND

In production systems including a server application and a database, best practices dictate that new versions of the application should be tested before they are deployed in order to allow detection of any errors or "bugs" in the new version before exposing end users to the new version.

Often, if the new version is run using the production database, testing the application includes modifying the data stored in the database. To avoid exposing end users to test data, a separate test copy of the database is made, and testing is performed using the test database.

BRIEF DESCRIPTION OF THE DRAWINGS

Some embodiments are illustrated by way of example and not limitation in the figures of the accompanying drawings.

DETAILED DESCRIPTION

Example methods and systems are directed to controlling access to data in a production environment. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some example embodiments, production data is stored in the production database and test data is stored in the test database. A production application may have access only to the data in the production database while a test application may have access to both the production database and the test database. The test application may have read-only access to the production database and read-write access to the test database.

In some example embodiments, data in the test database is handled differently than data in the production database. For example, a type of data (e.g., invoices) may be associated with a range of valid values (e.g., 1-1000). Each element of data may be assigned a single value, and this value may be sequential. The sequence may begin at opposite ends of the valid range depending on whether the data is stored in the production database or in the test database. For example, the first invoice stored in the production database may be invoice number 1, the second invoice stored in the production database may be invoice number 2, etc. Meanwhile, the first invoice stored in the test database may be invoice number 1000, the second invoice stored in the test database may be invoice number 999, etc. In some example embodiments, numbering the elements of the data from opposite ends of the valid range prevents the production application and the test application from creating elements with matching values.

Figure 1:
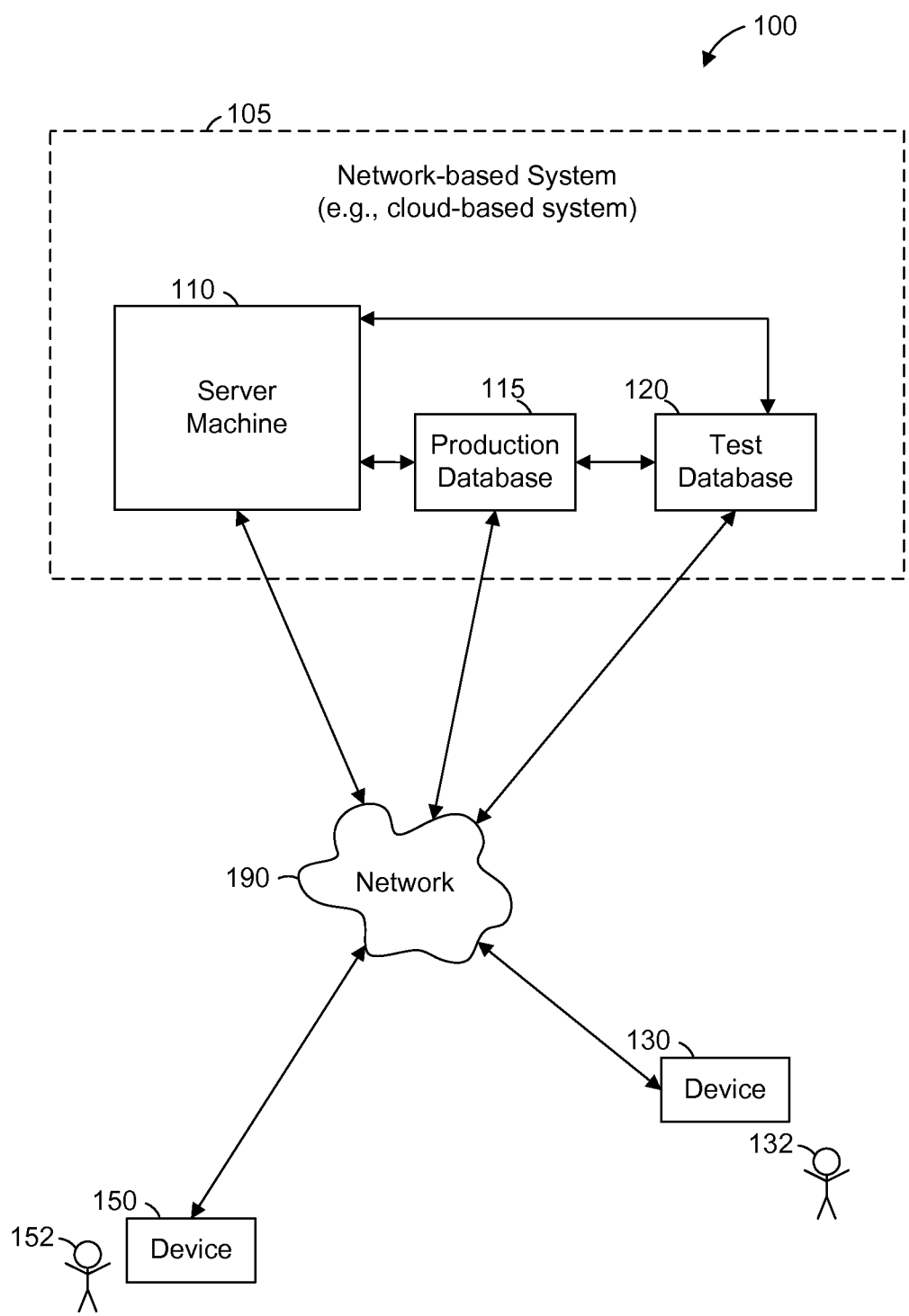
FIG. 1 is a network diagram illustrating a network environment suitable for testing an application in a production system, according to some example embodiments.

FIG. 1 is a network diagram illustrating a network environment 100 suitable for controlling access to a plurality of databases, according to some example embodiments. The network environment 100 includes a production system 105, a server machine 110, a production database 115, a test database 120, and devices 130 and 150, all communicatively coupled to each other via a network 190. The server machine 110 and the devices 130 and 150 may each be implemented in a computer system, in whole or in part, as described below with respect to FIG. 8.

In some example embodiments, the production system 105 is presented as a black box to the user. For example, the user may have only a single point of entry to the production system 105 and not be able to access each of the server machine 110, the production database 115, and the test database 120 individually. The server machine 110 may provide an interface to the databases 115 & 120, using modules as described below with respect to FIG. 2, performing tasks as described below with respect to FIGS. 4-7. The server machine 110, the production database 115, and the test database 120 may be connected via a separate network, via the network 190, or both.

In some example embodiments, the production database 115 stores production data for use by the production application. For example, the production database 115 may store billing invoices, production orders, bills of materials, or any suitable combination thereof. Production users may be using the production application and accessing production database 115 while test users are simultaneously using the test application and accessing both production database 115 and test database 120. The production application may have read-write access to the production database 115, allowing the production application to access data already stored and to store additional data in the production database 115. The production application may not have access to the test database 120, preventing production users from being exposed to test data.

In some example embodiments, the test database 120 stores test data for use by the test application. Both the test data and the production data may be used by the test application. The test application may have read-write access to the test database 120, allowing the test application to store test data. The test application may have read-only access to the production database 115, allowing the test application to read data written by the production application without being able to modify that data. In some example embodiments, some data in the production database 115 is modified by the test application. For example, if access to the production database 115 is logged within the production database 115, access by the test application may also be logged.

In some example embodiments, the device 130 is running a production version of an application while the device 150 is running a test version of the application. In some example embodiments, a single one of the devices 130 and 150 runs both the production version of the application and the test version of the application.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases 115 or 120, or devices 130 or 150 shown in FIG. 1 may be implemented in a general-purpose computer modified (e.g., configured or programmed) by software to be a special-purpose computer to perform the functions described herein for that machine, database 115 or 120, or device 130 or 150. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Production database 115 and test database 120 may be different types of data storage resources. Moreover, any two or more of the machines, databases 115 or 120, or devices 130 or 150 illustrated in FIG. 1 may be combined into a single machine, and the functions described herein for any single machine, database 115 or 120, or device 130 or 150 may be subdivided among multiple machines, databases 115 or 120, or devices 130 or 150.

The network 190 may be any network that enables communication between or among machines, databases 115 or 120, and devices 130 or 150 (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
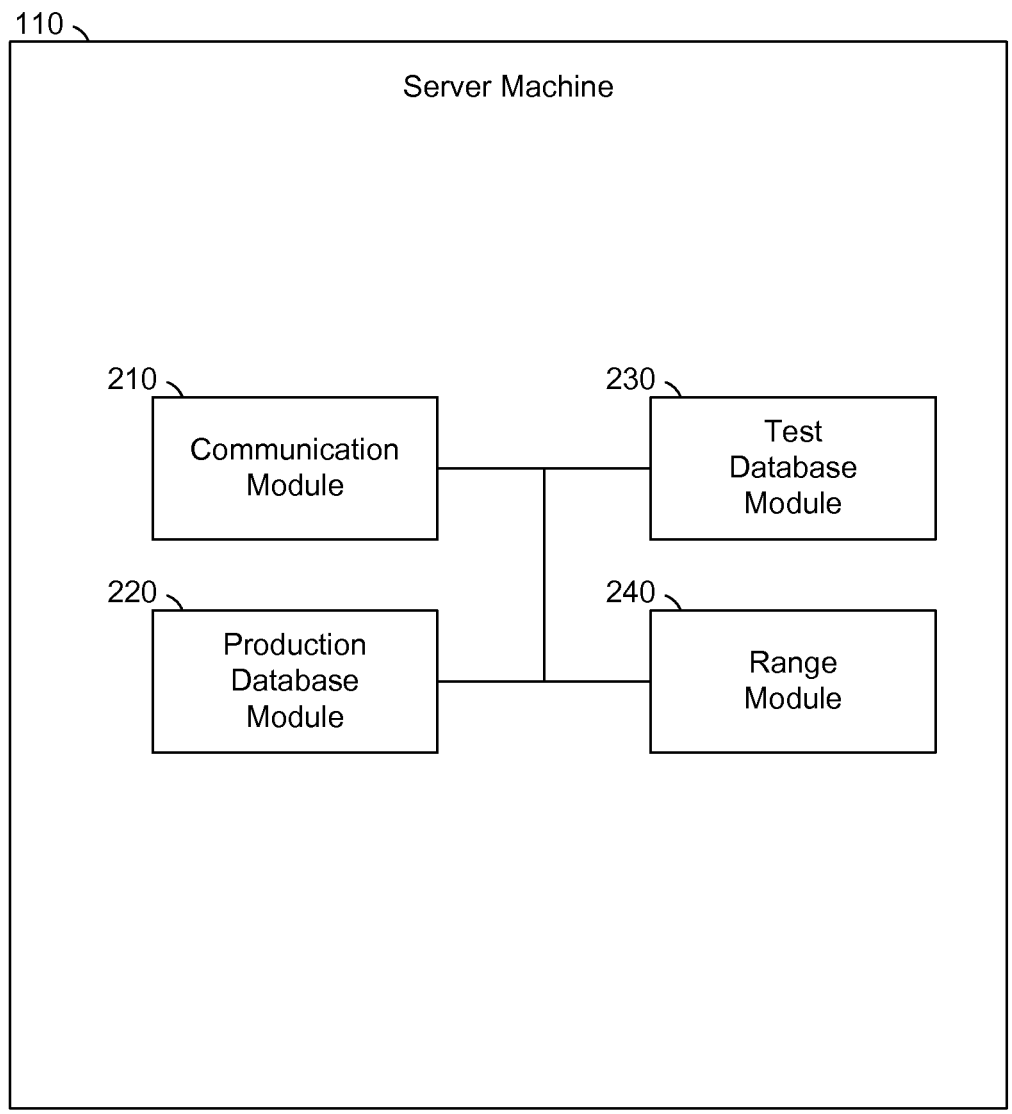
FIG. 2 is a block diagram illustrating components of a server machine suitable for serving an application to be tested in a production system, according to some example embodiments.

FIG. 2 is a block diagram illustrating components of the server machine 110, according to some example embodiments. The server machine 110 is shown as including a communication module 210, a production database module 220, a test database module 230, and a range module 240, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database 115 or 120, or device 130 or 150 may be distributed across multiple machines, databases 115 or 120, or devices 130 or 150.

The communication module 210 may communicate with a production application and a test application. For example, the communication module 210 may send and receive data packets containing requests. A request may include an indicator that indicates the origin of the packet and a query that indicates the data being requested or provided. For example, a packet may indicate that it originates at a test application or a production application. As another example, the query may indicate a set of records (e.g., all records in a table, all records regarding an individual, all records written in the last week, or any suitable combination thereof) or a specific record (e.g., invoice number 5, user "John Doe").

The communication module 210 may respond to data requests with records from the production database 115, the test database 120, or both. The communication module 210 may perform additional operations as described in FIGS. 4-7 below.

The production database module 220 may communicate with the production database 115 to process requests received by the communication module 210. The production database module 220 may execute queries against the production database 115 to identify one or more records responsive to the request. The production database module 220 may also execute queries against the production database 115 to write one or more records into the production database 115, or to modify one or more existing records in the production database 115.

The production database module 220 may also lock records in the production database 115 to prevent the locked records from being read, written, or both. In some example embodiments, a locked record may be modified by the owner of the lock (e.g., the user that requested the lock, the application that caused the lock, the request that caused the lock, or any suitable combination thereof).

The test database module 230 may communicate with the test database 120 to process requests received by the communication module 210. The test database module 230 may execute queries against the test database 120 to identify one or more records responsive to the request. The test database module 230 may also execute queries against the test database 120 to write one or more records into the test database 120, or to modify one or more existing records in the test database 120.

The test database module 230 may also communicate with the production database 115 to read data. In some example embodiments, the test database module 230 does not communicate with the production database 115 to write data or delete data.

The test database module 230 may also lock records in the test database 120 to prevent the locked records from being read, written, or both. In some example embodiments, a locked record may be modified by the owner of the lock (e.g., the user that requested the lock, the application that caused the lock, the request that caused the lock, or any suitable combination thereof).

Figure 3:
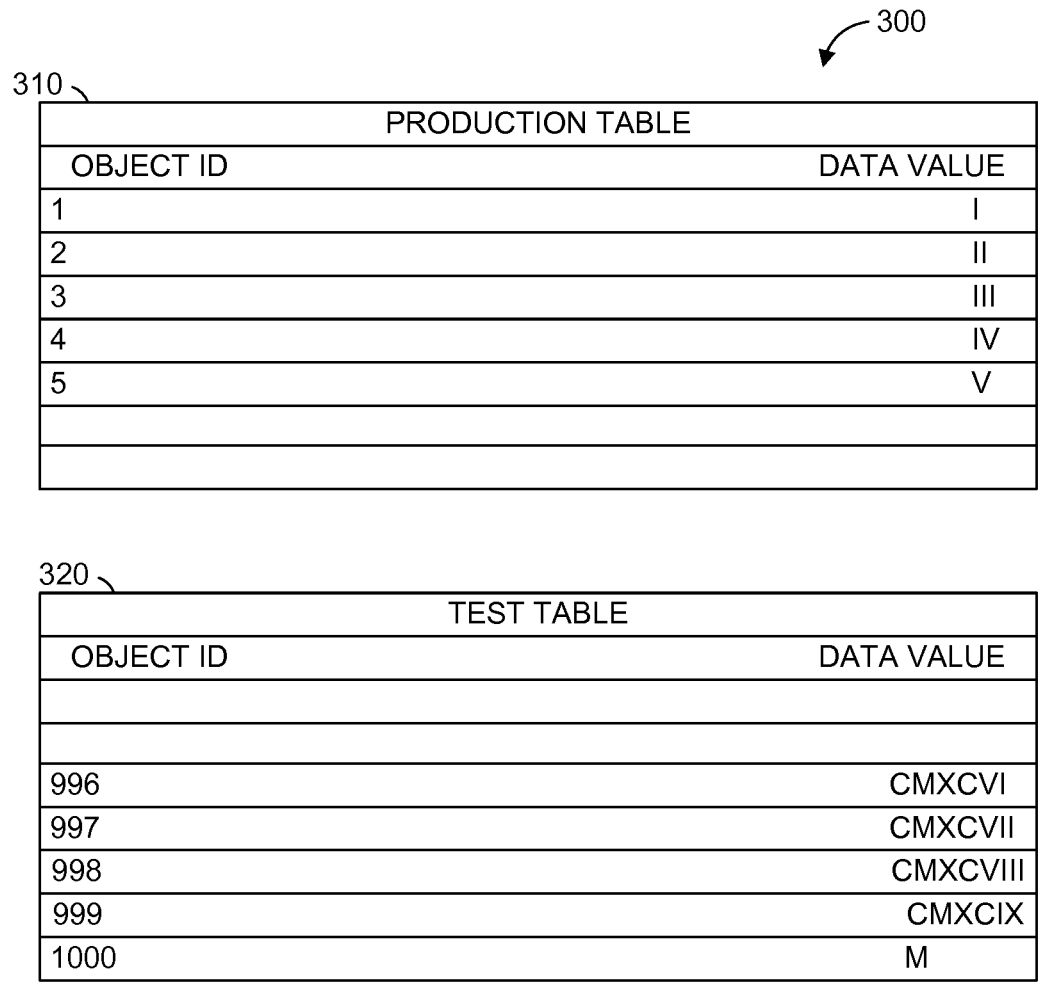
FIG. 3 is a block diagram illustrating corresponding tables, one in a production database and one in a test database, according to some example embodiments.

The range module 240 may identify a range of valid values (e.g., 1-1000) associated with a request, or associated with the type of data referenced by the request, received by the communication module 210. In some example embodiments, each element of data is assigned a single sequential value. The sequence may begin at opposite ends of the valid range depending on whether the data is stored in the production database 115 or in the test database 120. For example, the first invoice stored in the production database 115 may be invoice number 1, the second invoice stored in the production database 115 may be invoice number 2, etc. Meanwhile, the first invoice stored in the test database 120 may be invoice number 1000, the second invoice stored in the test database 120 may be invoice number 999, etc. In some example embodiments, numbering the elements of the data from opposite ends of the valid range prevents the production application and the test application from creating elements with matching values. FIG. 3, discussed below, shows an example of values assigned to records stored in the production database 115 and the test database 120.

FIG. 3 is a diagram showing a production table 310 in the production database 115 and a test table 320 in the test database 120, according to some example embodiments. Together, production table 310 and test table 320 comprise logical table 300, spanning the production database 115 and the test database 120. In this example, the logical table 300 includes two fields, an object ID field and a data value field. In this example, the object ID field contains a unique value for each row, such as may be used by range module 240. In this example, the data value field contains string data, with the Roman numeral representation of the object ID stored for each row. In other example embodiments, multiple data value fields may be present, with different data types (e.g., integer, floating-point number, character, string, bit field, binary large object, date, time, or any suitable combination thereof). As shown in FIG. 3, the object ID field has a minimum value of 1 and a maximum value of 1000. The five records in the production table 310 have been assigned the five lowest values. The five records in the test table 320 have been assigned the five highest values. In some example embodiments, a new record created in the production table 310 will be assigned the next available value from the bottom of the range (i.e., 6). In some example embodiments, a new record created in the test table 320 will be assigned the next available value from the top of the range (i.e., 995).

FIGS. 4-7 are flowcharts illustrating operations of the server machine 110 in performing methods 400, 500, 600, and 700 of processing requests, according to some example embodiments. Operations in the methods 400, 500, 600, and 700 may be performed by the server machine 110, using modules described above with respect to FIG. 2.

Figure 4:
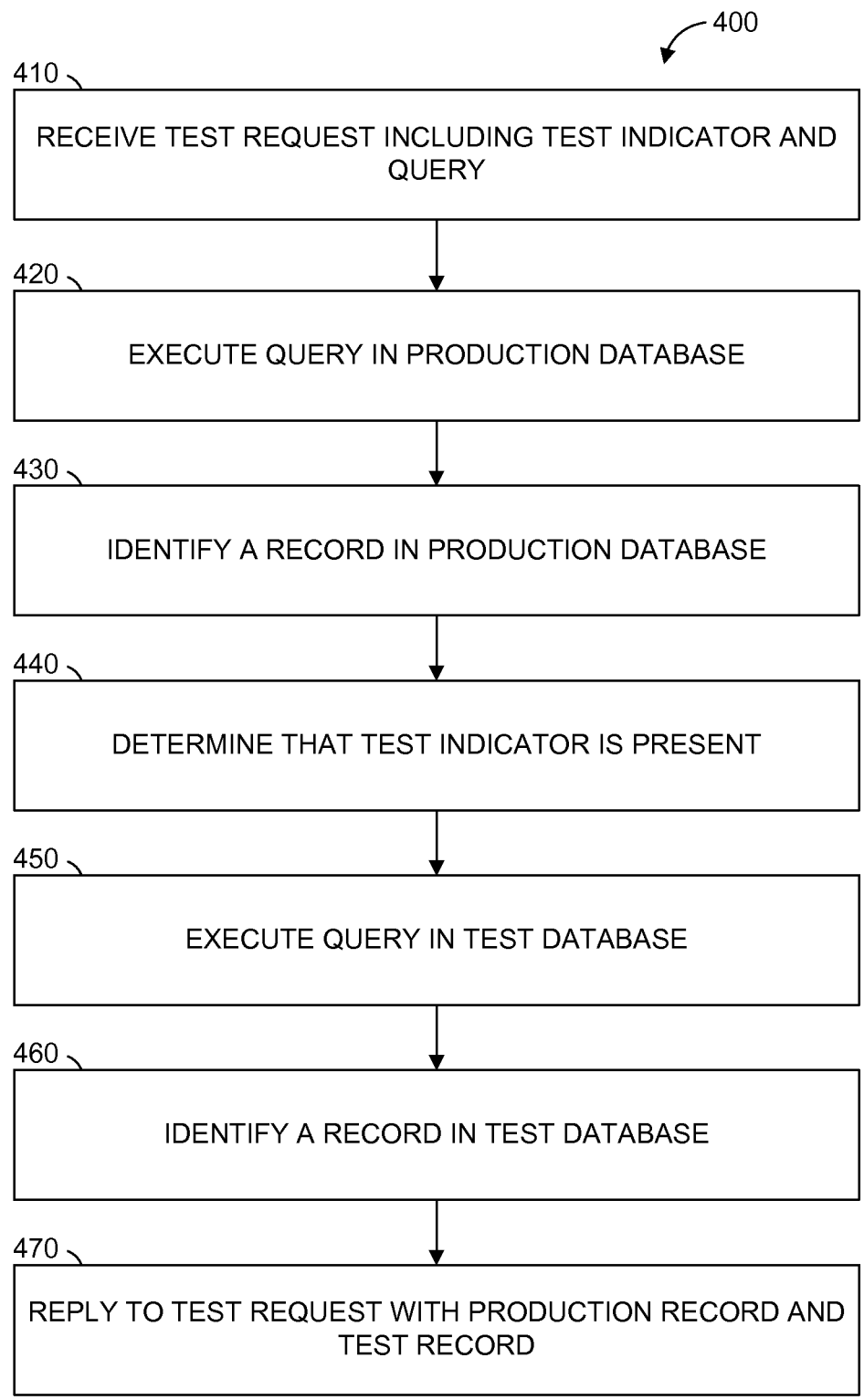
FIGS. 4-7 are flowcharts illustrating operations of a device in performing a method of testing an application in a production system, according to some example embodiments.

As shown in FIG. 4, the method 400 includes operations 410, 420, 430, 440, 450, 460, and 470. In various embodiments, more or fewer operations may be used.

In operation 410, the communication module 210 may receive a test request (e.g., a message, a data packet, or both) sent by a test application (e.g., a modified version of an existing application, a new application, or an existing application being deployed to new users or a new environment). The test request may include an indication of the origin of the request as well as a query. When this indication indicates that the origin of the request is the test application, it is considered to be a test indicator. The query may be executable in a database to read records from the database, write records to the database, modify existing records in the database, delete existing records in the database, or any suitable combination thereof.

In operation 420, the production database module 220 may execute the query in the production database 115. In some example embodiments, based on the presence of the test indicator, executing the query may be prevented from modifying the production database 115, but allowed to access data already stored in the production database 115.

In operation 430, the production database module 220 may identify one or more records in the production database 115 that are responsive to the query. For example, a query in SQL format could be "SELECT NAME FROM USERS". Executing this query in the production database 115 might identify "CURLY," "LARRY," and "MOE."

In operation 440, the communication module 210 may determine that the test indicator is present. Based on this determination, the communication module 210 may forward the request to the test database module 230.

In operation 450, the test database module 230 may execute the query in the test database 120.

In operation 460, the test database module 230 may identify one or more records in the test database 120 that are responsive to the query. For example, a query in SQL format could be "SELECT NAME FROM USERS". Executing this query in the test database 120 might identify "SHEMP" and "CURLY JOE."

In operation 460, the communication module 210 may reply to the test request with one or more of the records identified in operation 430 and one or more of the records identified in operation 460. For example, the communication module 210 may reply with "CURLY," "LARRY," "MOE," "SHEMP," and "CURLY JOE." In this example, the test application would receive all records responsive to the query in both the test database 120 and the production database 115. In other example embodiments, a subset of the responsive records may be chosen.

Figure 5:
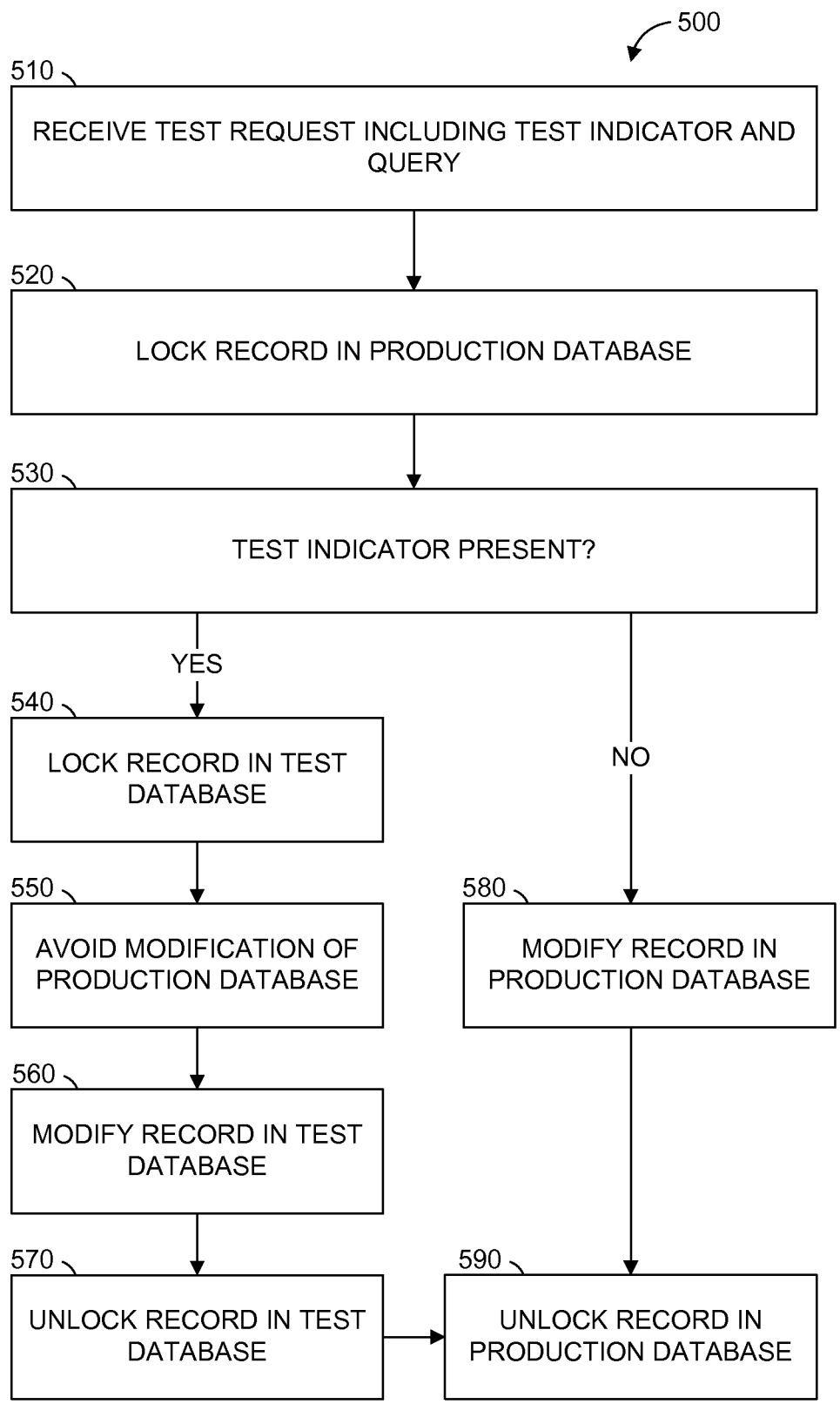

As shown in FIG. 5, the method 500 includes operations 510, 520, 530, 540, 550, 560, 570, 580, and 590. In various embodiments, more or fewer operations may be used.

In operation 510, the communication module 210 may receive a test request (e.g., a message, a data packet, or both) sent by a test application (e.g., a modified version of an existing application, a new application, or an existing application being deployed to new users or a new environment). The test request may include an indication of the origin of the request as well as a query. When this indication indicates that the origin of the request is the test application, it is considered to be a test indicator. The query may be executable in a database to read records from the database, write records to the database, modify existing records in the database, delete existing records in the database, or any suitable combination thereof.

In operation 520, the production database module 220 may lock one or more records in the production database 115 in response to the query. For example, a SQL "SELECT FOR UPDATE" query may prevent the selected records from being modified for a period of time or until another query unlocks them. As another example, a SQL "SELECT" query may prevent records in the affected tables from being modified while the query executes.

In operation 530, the communication module 210 may determine whether the test indicator is present in the request. If the test indicator is present, the communication module 210 may forward the query to the test database module 230, to perform operations 540, 560, and 570. If the test indicator is not present, this query, or a later query, may include an instruction to modify a record in the production database 115 that was locked in operation 520. In this case, with the test indicator not present, the modifying query would be forwarded to the production database module 220, to perform operation 580. As described below, operation 590 would follow the processing of the query by either the production database module 220 or the test database module 230.

In operation 540, the test database module 230 may lock one or more records in the test database 120 in response to the query. For example, a SQL "SELECT FOR UPDATE" query may prevent the selected records from being modified for a period of time or until another query unlocks them. As another example, a SQL "SELECT" query may prevent records in the affected tables from being modified while the query executes.

In operation 550, the communication module 210 may avoid modification of the production database 115. For example, after the record is locked in operation 520, the query or a subsequent query may attempt to modify the record. In this example, the communication module 210 may have recognized the presence of the test indicator in operation 530 and, based on the presence of the test indicator, avoid forwarding the query to the production database module 220, preventing the query from executing against the production database 115, and preventing the query from modifying the production database 115.

In operation 560, the test database module 230 may modify one or more records in the test database 120 in response to the query. For example, a SQL "UPDATE" query may modify existing records and an "INSERT" query may add new records.

In operation 570, the test database module 230 may unlock one or more of the records in the test database 120 that were locked in operation 540. In some example embodiments, the set of records unlocked in operation 570 is the full set of records locked in operation 540.

In operation 580, reached when the test indicator is not present, the production database module 220 may modify one or more records in the production database 115. In some example embodiments, this reflects the normal operation of the system when the test indicator is not used.

In operation 590, reached regardless of the state of the test indicator, the production database module 220 may unlock one or more of the records in the production database 115 that were locked in operation 520. In some example embodiments, the set of records unlocked in operation 590 is the full set of records locked in operation 520.

Figure 6:
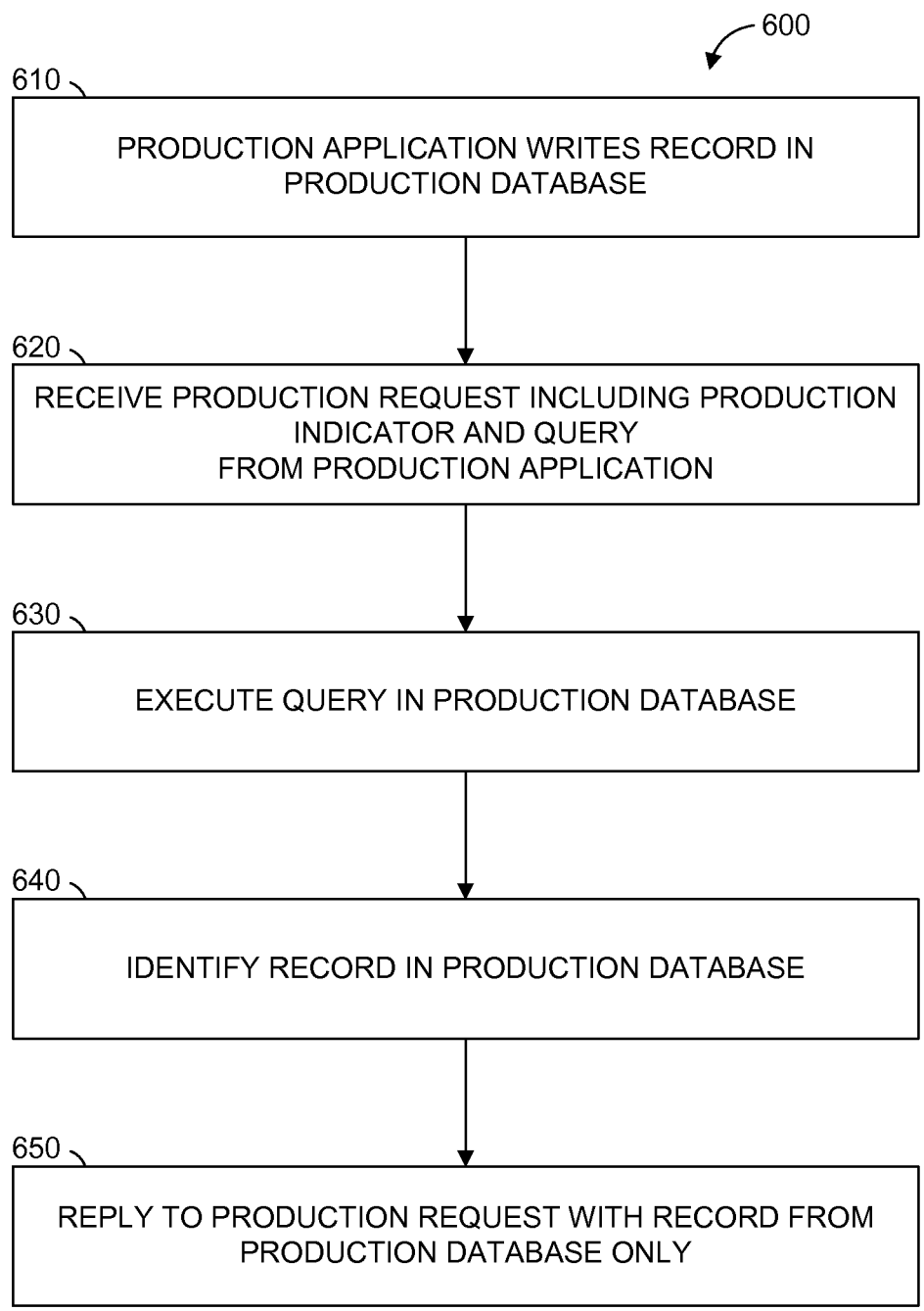

As shown in FIG. 6, the method 600 includes operations 610, 620, 630, 640, and 650. In various embodiments, more or fewer operations may be used.

In operation 610, the production application writes a record into the production database 115. In some example embodiments, this is accomplished by the production application sending a production request to the communication module 210, which forwards the query contained in the request to the production database module 220, which executes the query against the production database 115.

In operation 620, the communication module 210 receives a production request that includes a production indicator indicating that the origin of the request is a production application and a query. In some example embodiments, the production application may be the same application that wrote the record into the production database 115 in operation 610. In other example embodiments, the production application may be a different application. In some example embodiments, the production indicator is implemented as the absence of the test indicator. In other example embodiments, the production indicator is implemented as a separate data element in the request.

In operation 630, the production database module 220 executes the query against the production database 115.

In operation 640, the production database module 220 may identify one or more records in the production database 115 that are responsive to the query. For example, a query in SQL format could be "SELECT NAME FROM USERS". Executing this query in a production database 115 might identify "CURLY," "LARRY," and "MOE."

In operation 650, the communication module 210 replies to the request from the production application with one or more records from the production database 115 identified in operation 640. The reply to the production application does not include any records from the test database 120. In some example embodiments, the communication module 210 chose not to forward the query to the test database module 230 based on the presence of the production indicator or the absence of the test indicator.

Figure 7:
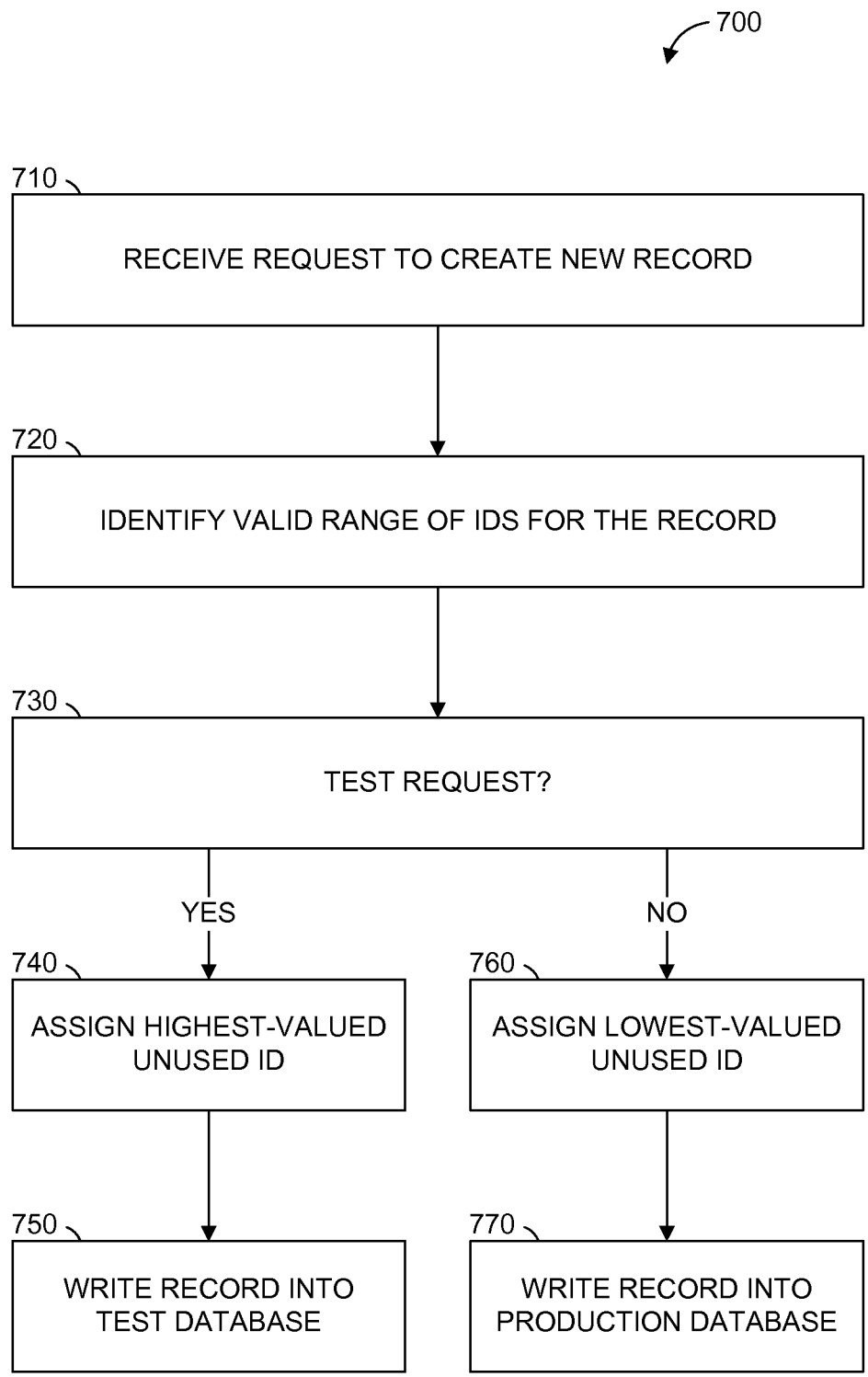

As shown in FIG. 7, the method 700 includes operations 710, 720, 730, 740, 750, 760, and 770. In various embodiments, more or fewer operations may be used.

In operation 710, the communication module 210 receives a request that includes a query that will create a new record. The request received in operation 710 may be the request received in operation 410 or operation 620 or another request.

In operation 720, the range module 240 identifies a valid range of identifiers ("IDs") for the type of record to be created. For example, if the record to be created will be stored in either the production table 310 or the test table 320, the valid range of identifiers is 1-1000. In some example embodiments, the range of IDs is numeric (e.g., 1-10, 1-999, or 1-65,536), alphanumeric (e.g., 0-Z or 1-zzz), or both. In some example embodiments, the range of IDs is sortable. For example, if the valid range of identifiers is 0-Z, and the valid characters are the numerals 0-9 and the characters a-z and A-Z, then one ordering would be to place numbers first, followed by lower-case characters, followed by upper-case characters.

In operation 730, the range module 240 determines if the request received in operation 710 is a test request. In some example embodiments, the range module 240 accesses the test indicator to make this determination. In other example embodiments, the communication module 210 makes the determination before communicating with the range module 240. If the range module 240 determines that the request is a test request, operations 740-750 may be performed. If the range module 240 determines that the request is a production request, operations 760-770 may be performed.

In operation 740, the range module 240 identifies the highest-valued unused ID and assigns it to the record to be created by the request. Referring to the example tables shown in FIG. 3, the highest-valued unused ID is 995.

In operation 750, the test database module 230 writes the record into the test database 120, using the ID assigned by the range module 240.

In operation 760, the range module 240 identifies the lowest-valued unused ID and assigns it to the record to be created by the request. Referring to the example tables shown in FIG. 3, the lowest-valued unused ID is 6.

In operation 770, the production database module 220 writes the record into the production database 115, using the ID assigned by the range module 240.

According to various example embodiments, one or more of the methodologies described herein may facilitate controlling access to two or more databases by two or more applications. Moreover, one or more of the methodologies described herein may facilitate testing of an application with read-only access to production data, allowing the tested application to work with real-world data without risking corruption of the production data by test data. Furthermore, one or more of the methodologies described herein may facilitate allowing the test application to access production data instead of limiting access to a test database 120, which may allow testing to begin without the delay caused by copying all or a portion of the production data into the test database 120. One or more of the methodologies described herein may facilitate storing records in two or more databases 115 and 120, ensuring that each record has a unique ID even across the databases 115 and 120, without requiring modification of a production application, or exposure of test data to the production application.

When these effects are considered in aggregate, one or more of the methodologies described herein may obviate a need for certain efforts or resources that otherwise would be involved in controlling access to two or more databases 115 or 120 by two or more applications. Efforts expended by a user in testing an application or controlling access to a database 115 or 120 may be reduced by one or more of the methodologies described herein. Computing resources used by one or more machines, databases 115 or 120, or devices 130 or 150 (e.g., within the network environment 100) may similarly be reduced. Examples of such computing resources include processor cycles, network traffic, memory usage, data storage capacity, power consumption, and cooling capacity.

Figure 8:
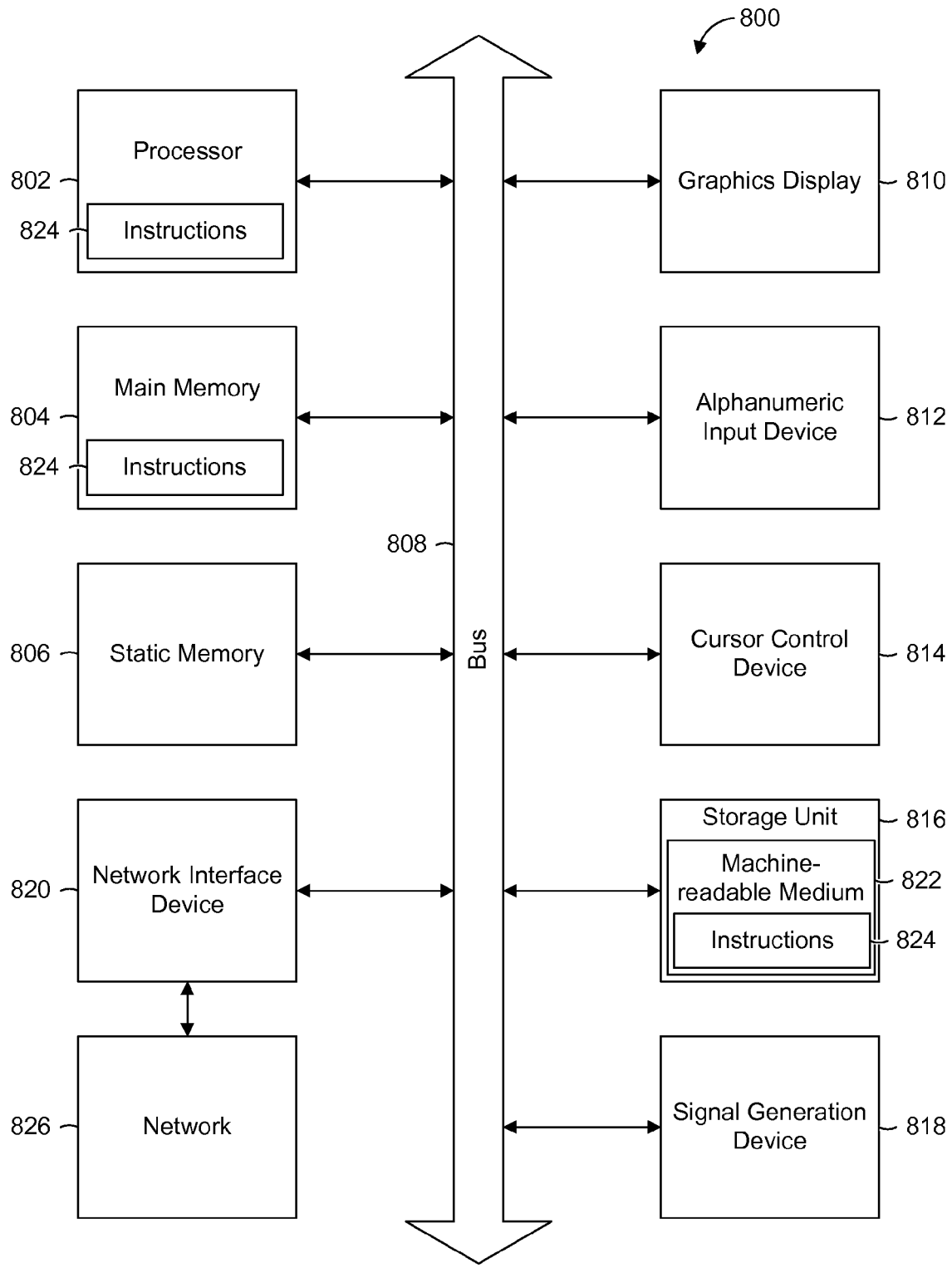
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 8 shows a diagrammatic representation of the machine 800 in the example form of a computer system and within which instructions 824 (e.g., software, a program, an application, an applet, an app, or other executable code) for causing the machine 800 to perform any one or more of the methodologies discussed herein may be executed, in whole or in part. In alternative embodiments, the machine 800 operates as a standalone device or may be connected (e.g., networked) to other machines. In a networked deployment, the machine 800 may operate in the capacity of a server machine 110 or a client machine in a server-client network environment 100, or as a peer machine in a distributed (e.g., peer-to-peer) network environment 100. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine 800 capable of executing the instructions 824, sequentially or otherwise, that specify actions to be taken by that machine 800. Further, while only a single machine 800 is illustrated, the term "machine" shall also be taken to include a collection of machines 800 that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 embodying any one or more of the methodologies or functions described herein. The instructions 824 may also reside, completely or at least partially, within the main memory 804, within the processor 802 (e.g., within the processor 802's cache memory), or both, during execution thereof by the machine 800. Accordingly, the main memory 804 and the processor 802 may be considered as machine-readable media 822. The instructions 824 may be transmitted or received over a network 826 (e.g., network 190) via the network interface device 820.

As used herein, the term "memory" refers to a machine-readable medium 822 able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing instructions 824 for execution by a machine (e.g., machine 800), such that the instructions 824, when executed by one or more processors of the machine 800 (e.g., processor 802), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor 802, such as a field programmable gate array (FPGA) or an ASIC. A hardware module may also include programmable logic or circuitry that is temporarily configured by software to perform certain operations. For example, a hardware module may include software encompassed within a general-purpose processor 802 or other programmable processor 802. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 802 configured by software to become a special-purpose processor 802, the general-purpose processor 802 may be configured as respectively different special-purpose processors 802 (e.g., comprising different hardware modules) at different times. Software may accordingly configure a processor 802, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions described herein. As used herein, "processor-implemented module" refers to a hardware module implemented using one or more processors 802.

Similarly, the methods described herein may be at least partially processor-implemented, a processor 802 being an example of hardware. For example, at least some of the operations of a method may be performed by one or more processors 802 or processor-implemented modules. Moreover, the one or more processors 802 may also operate to support performance of the relevant operations in a "cloud computing" environment or as a "software as a service" (SaaS). For example, at least some of the operations may be performed by a group of computers (as examples of machines 800 including processors 802), with these operations being accessible via a network (e.g., the Internet) and via one or more appropriate interfaces (e.g., an application program interface (API)).

The performance of certain of the operations may be distributed among the one or more processors 802, not only residing within a single machine 800, but deployed across a number of machines 800. In some example embodiments, the one or more processors 802 or processor-implemented modules may be located in a single geographic location (e.g., within a home environment, an office environment, or a server farm). In other example embodiments, the one or more processors 802 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 800. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 800 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media 822, and systems (e.g., apparatus) discussed herein:

1. A method comprising:
    receiving a test request that includes:
        a test indicator that indicates that the test request originated from a test application corresponding to a test database, the test database being accessible to the test application and inaccessible to a production application; and
        a query that is executable to identify a first record in a production database, the production database being accessible to the test application and the production application;
    identifying the first record in the production database by executing the query against the production database, wherein the first record contains data written by the production application and does not contain data written by the test application;
    based on the test indicator being included with the query in the test request, identifying a second record in the test database by executing the query against the test database, using a processor of a machine; and
    replying to the test request with the first record and with the second record.

2. The method of description 1, wherein the second record contains data written by the test application and does not contain data written by the production application.

3. The method of any of descriptions 1 or 2, further comprising:
    in response to receiving the test request:
        locking the first record in the production database; and
        based on the test indicator being included with the query in the test request, locking the second record in the test database.

4. The method of description 3, further comprising:
    based on the test indicator being included with the query in the test request:
        unlocking the locked first record in the production database;
        during a time period between locking the first record in the production database and unlocking the first record in the production database, avoiding modification of the first record in the production database;
        unlocking the locked second record in the test database; and
        during a time period between locking the second record in the test database and unlocking the second record in the test database, based on the query request, modifying the second record in the test database.

5. The method of any of descriptions 1-4 further comprising:
    receiving a production request that includes:
        a production indicator that indicates that the request originated from the production application, and
        a production query that is executable to identify a third record in the production database;
    identifying the third record in the production database by executing the production query against the production database, the third record containing data written by the production application; and
    replying to the production request with the third record.

6. The method of description 5, wherein the replying to the production request with the third record includes replying to the production record without any records from the test database.

7. The method of any of descriptions 1-6 further comprising:
    identifying a range of values associated with a set of records,
        the set of records comprising a production set of records in the production database and a test set of records in the test database,
        each record of the set of records being assigned a unique value of the range of values,
        the values assigned to the records of the production set of records being sequential with a lowest valued record of the production set of records being assigned the lowest value of the range of values,
        the values assigned to the records of the test set of records being sequential with a highest valued record of the test set of records being assigned the highest value of the range of values,
        the range of values being larger than the set of records.

8. The method of description 7 further comprising:
    identifying a highest value in the range of values that is unassigned to any record of the set of records;
    writing a fourth record into the test database by executing the query in the test database; and
    based on the test indicator being included with the query in the test request, assigning the highest value to the fourth record.

9. The method of description 8 further comprising:
    receiving a production request that includes:
        a production indicator that indicates that the request originated from the production application, and
        a production query that is executable to identify a third record in the production database;
    identifying the third record in the production database by executing the production query against the production database, wherein the third record contains data written by the production application and does not contain data written by the test application;
    replying to the production request with the third record;
    identifying a lowest value of the range of values that is unassigned to any record of the set of records;
    writing a fifth record in the production database by executing the production query in the production database; and
    based on the production indicator being included with the production query in the production request, assigning the lowest value to the fifth record.

10. The method of description 9, wherein the replying to the production request with the third record includes replying to the production record without any records from the test database.

11. A non-transitory machine-readable storage medium comprising instructions that, when executed by one or more processors of a machine, cause the machine to perform operations comprising:
    receiving a test request that includes:
        a test indicator that indicates that the test request originated from a test application corresponding to a test database, the test database being accessible to the test application and inaccessible to a production application; and a query that is executable to identify a first record in a production database, the production database being accessible to the test application and the production application;

identifying the first record in the production database by executing the query against the production database, wherein the first record contains data written by the production application and does not contain data written by the test application;

based on the test indicator being included with the query in the test request, identifying a second record in the test database by executing the query against the test database, using a processor of a machine; and replying to the test request with the first record and with the second record.

12. The non-transitory machine-readable storage medium of description 11, wherein the operations further comprise:
in response to receiving the test request:
locking the first record in the production database; and
based on the test indicator being included with the query in the test request, locking the second record in the test database.

13. The non-transitory machine-readable storage medium of description 12, wherein the operations further comprise:
based on the test indicator being included with the query in the test request:
unlocking the locked first record in the production database;
during a time period between locking the first record in the production database and unlocking the first record in the production database, avoiding modification of the first record in the production database;
unlocking the locked second record in the test database; and
during a time period between locking the second record in the test database and unlocking the second record in the test database, based on the query request, modifying the second record in the test database.

14. The non-transitory machine-readable storage medium of any of descriptions 11-13, wherein the operations further comprise:
receiving a production request that includes:
a production indicator that indicates that the request originated from the production application, and
a production query that is executable to identify a third record in the production database;
identifying the third record in the production database by executing the production query against the production database, the third record containing data written by the production application; and
replying to the production request with the third record without any records from the test database.

15. The non-transitory machine-readable storage medium of any of descriptions 11-14, wherein the operations further comprise:
identifying a range of values associated with a set of records,
the set of records comprising a production set of records in the production database and a test set of records in the test database,
each record of the set of records being assigned a unique value of the range of values,
the values assigned to the records of the production set of records being sequential,
a lowest valued record of the production set of records being assigned the lowest value of the range of values,
the values assigned to the records of the test set of records being sequential,
a highest valued record of the test set of records being assigned the highest value of the range of values,
the range of values being larger than the set of records;
identifying a highest value of the range of values that is unassigned to any record of the set of records;
writing a fourth record in the test database by executing the query in the test database; and
based on the test indicator being included with the query in the test request, assigning the highest value to the fourth record.

16. A system comprising:
a communication module configured to:
receive a test request that includes:
a test indicator that indicates that the test request originated from a test application corresponding to a test database, the test database being accessible to the test application and inaccessible to a production application; and
a query that is executable to identify a first record in a production database, the production database being accessible to the test application and the production application;
a production database module configured to:
identify the first record in the production database by executing the query against the production database, wherein the first record contains data written by the production application and does not contain data written by the test application;
a processor configured by a test database module to:
based on the test indicator being included with the query in the test request, identify a second record in the test database by executing the query against the test database, using a processor of a machine, wherein
the communication module is further configured to:
reply to the test request with the first record and with the second record.

17. The system of description 16, wherein:
the production database module is further configured to:
in response to receiving the request, lock the first record in the production database; and
the test database module is further configured to:
based on the test indicator being included with the query in the test request, lock the second record in the test database.

18. The system of description 17, wherein:
the production database module is further configured to:
based on the test indicator being included with the query in the test request:
unlock the locked first record in the production database;
during a time period between locking the first record in the production database and unlocking the first record in the production database, avoid modification of the first record in the production database; and
the test database module is further configured to:
based on the test indicator being included with the query in the test request:
unlock the locked second record in the test database; and
during a time period between locking the second record in the test database and unlocking the second record in the test database, based on the query request, modify the second record in the test database.

19. The system of any of descriptions 16-18, wherein:
the communication module is further configured to:
    receive a production request that includes:
        a production indicator that indicates that the request originated from the production application, and
        a production query that is executable to identify a third record in the production database;
the production database module is further configured to:
    identify the third record in the production database by executing the production query against the production database, the third record containing data written by the production application; and
the communication module is further configured to:
    reply to the production request with the third record and without any records from the test database.

20. The system of any of descriptions 16-19, wherein:
a range module is configured to:
    identify a range of values associated with a set of records,
        the set of records comprising a production set of records in the production database and a test set of records in the test database,
        each record of the set of records being assigned a unique value of the range of values, the values assigned to the records of the production set of records being sequential,
        a lowest valued record of the production set of records having a lowest value of the range of values,
        the values assigned to the records of the test set of records being sequential,
        a highest valued record of the test set of records having a highest value of the range of values,
        the range of values being larger than the set of records; and
    identify a highest value of the range of values that is unassigned to any record of the set of records; and
the test database module is further configured to:
    write a fourth record in the test database by executing the query in the test database; and
    based on the test indicator being included with the query in the test request, assigning the highest value to the fourth record.

What is claimed is:

1. A method comprising:
storing production data in a production table in a production database, the production data including a plurality of records, each record of the production data in the production table having a corresponding unique value in a range of values the range of values being sequential, the unique values of the production data records also being sequential and including the lowest value in the range of values;
storing test data in a test table in a test database, the test data including a plurality of records, each record of the test data in the test table having a corresponding unique value in the range of values, the unique values of the test data records being sequential and including the highest value in the range of values;
receiving a test request that includes:
    a test indicator that indicates that the test request originated from a test application corresponding to the test database; and
    a query that is executable to write a first record in the test table in the test database;
based on the test indicator indicating that the test request originated from the test application, writing the first record in the test table in the test database with a corresponding unique value that is the highest unused value of the range of values, the value being selected based on a descending order of the range of values;
receiving a production request that includes:
    a production indicator that indicates that the production request originated from a production application corresponding to the production database; and
    a query that is executable to write a second record in the production table in the production database; and
based on the production indicator indicating that the production request originated from the production application, writing the second record in the production table in the production database with a corresponding unique value that is the lowest unused value of the range of values, the value being selected based on an ascending order of the range of values.

2. The method of claim 1, further comprising:
receiving a second test request that includes:
    a second test indicator that indicates that the second test request originated from the test application; and
    a second query that is executable to identify a second record in the production database;
identifying the second record in the production database by executing the second query against the production database, wherein the second record contains data written by the production application and does not contain data written by the test application;
based on the second test indicator being included with the second query in the second test request, identifying a third record in the test database by executing the query against the test database, using a processor of a machine, wherein the third record contains data written by the test application and does not contain data written by the production application; and
replying to the second test request with the second record and with the third record.

3. The method of claim 2, further comprising:
in response to receiving the second test request:
    locking the second record in the production database; and
    based on the second test indicator being included with the second query in the second test request, locking the third record in the test database.

4. The method of claim 3, further comprising:
based on the second test indicator being included with the second query in the second test request:
    unlocking the locked second record in the production database; and
    during a time period between locking the second record in the production database and unlocking the second record in the production database, avoiding modification of the second record in the production database;
unlocking the locked third record in the test database; and
during a time period between locking the third record in the test database and unlocking the third record in the test database, based on the second test request, modifying the third record in the test database.

5. The method of claim 1 further comprising:
receiving a second production request that includes:
    a production indicator that indicates that the second production request originated from the production application, and a second production query that is executable to identify a third record in the production database;

identifying the third record in the production database by executing the second production query against the production database, the third record containing data written by the production application; and replying to the second production request with the third record.

6. The method of claim 5, wherein the replying to the second production request with the third record includes replying to the production request without any records from the test database.

7. The method of claim 1, wherein the values assigned to the records of the production set of records being assigned in ascending order and the values assigned to the records of the test set of records being assigned in descending order prevents the production application and the test application from creating records with matching values.

8. A non-transitory machine-readable storage medium comprising instructions that, when executed by one or more processors of a machine, cause the machine to perform operations comprising:

storing production data in a production table in a production database, the production data including a plurality of records, each record of the production data in the production table having a corresponding unique value in a range of values, the range of values being sequential, the unique values of the production data records also being sequential and including the lowest value in the range of values;

storing test data in a test table in a test database, the test data including a plurality of records, each record of the test data in the test table having a corresponding unique value in the range of values, the unique values of the test data records being sequential and including the highest value in the range of values;

receiving a test request that includes:
  a test indicator that indicates that the test request originated from a test application corresponding to the test database; and
  a query that is executable to write a first record in the test table in the test database;

based on the test indicator indicating that the test request originated from the test application, writing the first record in the test table in the test database with a corresponding unique value that is the highest unused value of the range of values, the value being selected based on a descending order of the range of values;

receiving a production request that includes:
  a production indicator that indicates that the production request originated from a production application corresponding to the production database; and
  a query that is executable to write a second record in the production table in the production database; and based on the production indicator indicating that the production request originated from the production application, writing the second record in the production table in the production database with a corresponding unique value that is the lowest unused value of the range of values, the value being selected based on an ascending order of the range of values.

9. The non-transitory machine-readable storage medium of claim 8, wherein the operations further comprise:

receiving a second test request that includes:
  a second test indicator that indicates that the second test request originated from the test application; and
  a second query that is executable to identify a second record in the production database;

identifying the second record in the production database by executing the second query against the production database, wherein the second record contains data written by the production application and does not contain data written by the test application;

based on the second test indicator being included with the second query in the second test request, identifying a third record in the test database by executing the query against the test database; and in response to receiving the second test request:
  locking the second record in the production database; and
  based on the second test indicator being included with the query in the second test request, locking the third record in the test database.

10. The non-transitory machine-readable storage medium of claim 9, wherein the operations further comprise:

based on the second test indicator being included with the second query in the second test request:
  unlocking the locked second record in the production database; and
  during a time period between locking the second record in the production database and unlocking the second record in the production database, avoiding modification of the second record in the production database;

unlocking the locked third record in the test database; and
during a time period between locking the third record in the test database and unlocking the third record in the test database, based on the second test request, modifying the third record in the test database.

11. The non-transitory machine-readable storage medium of claim 8, wherein the operations further comprise:

receiving a second production request that includes:
  a production indicator that indicates that the second production request originated from the production application, and
  a second production query that is executable to identify a third record in the production database;

identifying the third record in the production database by executing the second production query against the production database, the third record containing data written by the production application; and replying to the second production request with the third record without any records from the test database.

12. A system comprising:
a memory storing instructions; and
one or more processors configured by the instructions to perform operations comprising:
  storing production data in a production table in a production database, the production data including a plurality of records, each record of the production data in the production table having a corresponding unique value in a range of values, the range of values being sequential, the unique values of the production data records also being sequential and including the lowest value in the range of values;
  storing test data in a test table in a test database, the test data including a plurality of records, each record of the test data in the test table having a corresponding unique value in the range of values, the unique values of the test data records being sequential and including the highest value in the range of values;
  receiving a test request that includes:

a test indicator that indicates that the test request originated from a test application corresponding to the test database; and a query that is executable to write a first record in the test table in the test database;

based on the test indicator indicating that the test request originated from the test application, writing the first record in the test table in the test database with a corresponding unique value that is the highest unused value of the range of values, the value being selected based on a descending order of the range of values;

receiving a production request that includes:

a production indicator that indicates that the production request originated from a production application corresponding to the production database; and a query that is executable to write a second record in the production table in the production database; and based on the production indicator indicating that the production request originated from the production application, writing the second record in the production table in the production database with a corresponding unique value that is the lowest unused value of the range of values, the value being selected based on an ascending order of the range of values.

13. The system of claim 12, wherein the operations further comprise:

receiving a second test request that includes:

a second test indicator that indicates that the second test request originated from the test application; and a second query that is executable to identify a second record in the production database;

identifying the second record in the production database by executing the second query against the production database, wherein the second record contains data written by the production application and does not contain data written by the test application;

based on the second test indicator being included with the second query in the second test request, identifying a third record in the test database by executing the query against the test database;

in response to receiving the second test request, locking the second record in the production database; and based on the second test indicator being included with the second query in the second test request, locking the third record in the test database.

14. The system of claim 13, wherein the operations further comprise:

based on the second test indicator being included with the second query in the second test request:

unlocking the locked second record in the production database; and during a time period between locking the second record in the production database and unlocking the second record in the production database, avoiding modification of the second record in the production database;

unlocking the locked third record in the test database; and during a time period between locking the third record in the test database and unlocking the third record in the test database, based on the second test request, modifying the third record in the test database.

15. The system of claim 12, wherein the operations further comprise:

receiving a second production request that includes:

a production indicator that indicates that the second production request originated from the production application, and a second production query that is executable to identify a third record in the production database;

identifying the third record in the production database by executing the second production query against the production database, the third record containing data written by the production application; and replying to the second production request with the third record and without any records from the test database.

* * * * *